US007058538B2

(12) United States Patent
Traversa et al.

(10) Patent No.: US 7,058,538 B2
(45) Date of Patent: Jun. 6, 2006

(54) METHOD FOR DETERMINING THE INSTANT OF REACHING OF THE STROKE END POSITION IN THE DEACTIVATION PHASE OF A MOVABLE ELEMENT HAVING SHUTTER FUNCTION FORMING PART OF A SOLENOID VALVE

(75) Inventors: Piergiacomo Traversa, Orbassano (IT); Alberto Pisoni, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 10/992,774

(22) Filed: Nov. 22, 2004

(65) Prior Publication Data

US 2005/0146408 A1 Jul. 7, 2005

(30) Foreign Application Priority Data

Nov. 21, 2003 (IT) .......................... TO2003A0926

(51) Int. Cl.
*G01C 19/00* (2006.01)

(52) U.S. Cl. ......................... 702/150; 702/94; 702/151

(58) Field of Classification Search .................. 702/33, 702/36, 38, 89, 94, 105, 106, 113, 150, 151; 123/52.2, 53.1, 90.1, 90.15, 406.69, 406.74
See application file for complete search history.

(56) References Cited

U.S. PATENT DOCUMENTS

| | | | | |
|---|---|---|---|---|
| 5,245,501 | A * | 9/1993 | Locher et al. | 361/154 |
| 5,271,667 | A * | 12/1993 | Takata et al. | 303/113.2 |
| 5,825,216 | A * | 10/1998 | Archer et al. | 327/110 |
| 5,995,356 | A * | 11/1999 | Glavmo et al. | 361/154 |
| 2002/0100442 | A1* | 8/2002 | Takahashi et al. | 123/90.17 |

FOREIGN PATENT DOCUMENTS

WO WO 94/13991 6/1994

* cited by examiner

*Primary Examiner*—Bryan Bui
(74) *Attorney, Agent, or Firm*—Sughrue Mion, PLLC

(57) ABSTRACT

A method for determining the stroke end instant of the shutter during the deactivation phase of an electro-valve. The method comprises the following steps: assessment of nominal deactivation time and deduction from time of the assessed instant in which the deactivated shutter reaches the stroke end position, application of an appreciable current flow through the coil during shutter motion, after coil deactivation, adjusted in a time range comprising the assessed nominal deactivation instant, acquisition of a convenient number of current samples, identification of two adequate interpolation curves for acquired data, which approximate the development of the samples acquired before and after the instant in which the shutter reaches the stroke end, respectively, determination of the intersection point of the interpolation curves, from which the intersection instant can be inferred, and identification of shutter stroke end instant with the intersection instant.

4 Claims, 6 Drawing Sheets

Flow chart of steps required for determining the stroke end instant of the shutter during valve deactivation phase according to the method of the present invention

FIGURE 5

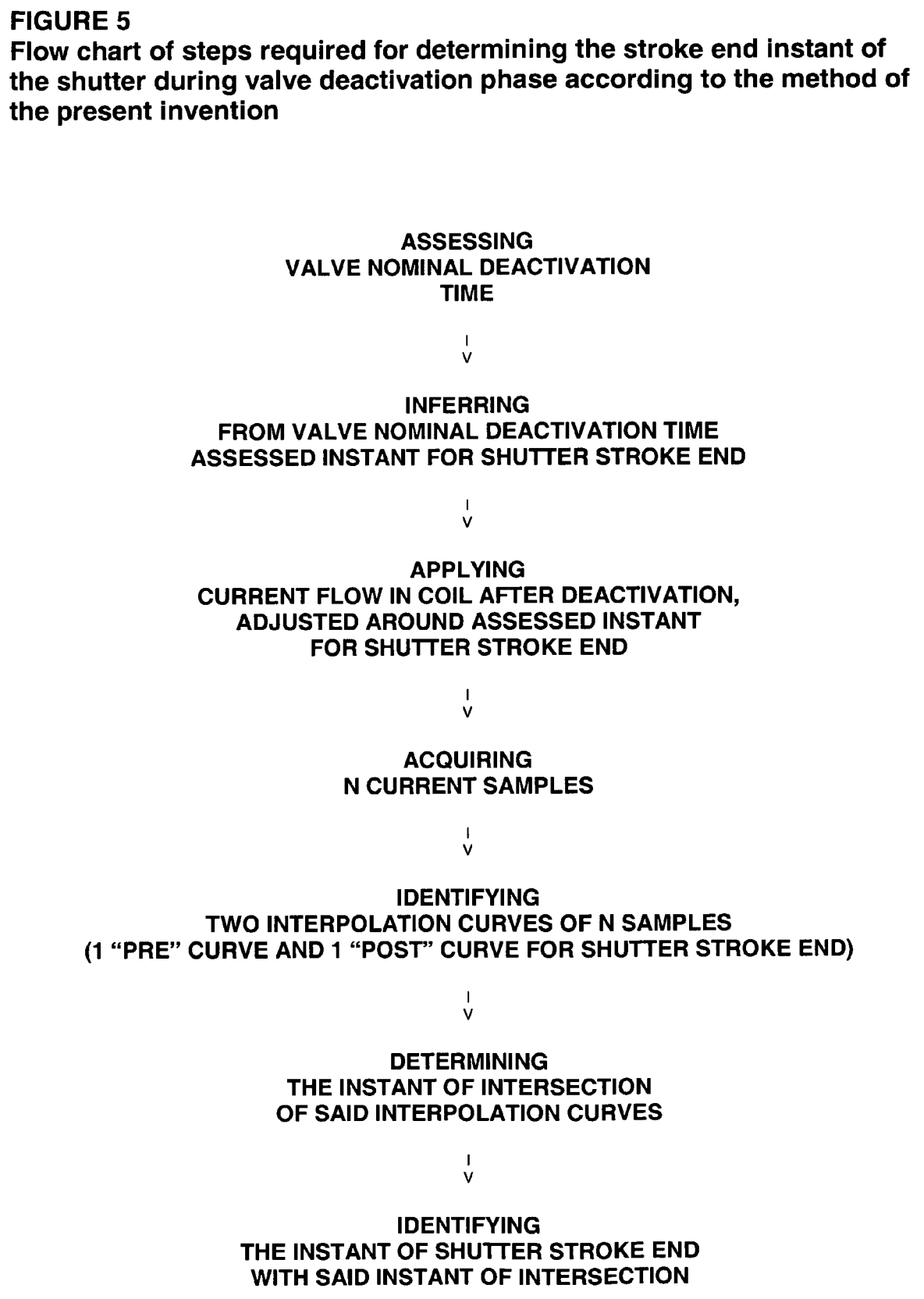

Flow chart of steps required for determining the stroke end instant of the shutter during valve deactivation phase according to the method of the present invention

ASSESSING
VALVE NOMINAL DEACTIVATION
TIME

I
V

INFERRING
FROM VALVE NOMINAL DEACTIVATION TIME
ASSESSED INSTANT FOR SHUTTER STROKE END

I
V

APPLYING
CURRENT FLOW IN COIL AFTER DEACTIVATION,
ADJUSTED AROUND ASSESSED INSTANT
FOR SHUTTER STROKE END

I
V

ACQUIRING
N CURRENT SAMPLES

I
V

IDENTIFYING
TWO INTERPOLATION CURVES OF N SAMPLES
(1 "PRE" CURVE AND 1 "POST" CURVE FOR SHUTTER STROKE END)

I
V

DETERMINING
THE INSTANT OF INTERSECTION
OF SAID INTERPOLATION CURVES

I
V

IDENTIFYING
THE INSTANT OF SHUTTER STROKE END
WITH SAID INSTANT OF INTERSECTION

METHOD FOR DETERMINING THE INSTANT OF REACHING OF THE STROKE END POSITION IN THE DEACTIVATION PHASE OF A MOVABLE ELEMENT HAVING SHUTTER FUNCTION FORMING PART OF A SOLENOID VALVE

FIELD OF THE INVENTION

The present invention relates in general to the control of an electro-valve, or solenoid valve, and relates in particular to a method for determining the stroke end instant of the shutter of such a valve during the deactivation phase of the solenoid.

In a solenoid electro-valve the movable part acting as shutter can be shifted between two opening and closing abutting positions (in the following referred to as first position and second position) by applying a suitable piloting current profile.

The measure of time between the activation instant of the solenoid and the instant in which the shutter reaches the first abutting position (activation time), and the measure of time between the deactivation instant of the solenoid and the instant in which the shutter reaches the second abutting position (deactivation time) are extremely important for a stable valve control.

The present invention relates specifically to a method for measuring the deactivation time of a solenoid valve.

PRIOR ART

Document WO-A-9413991 has already described the physical phenomenon involved in the process which the present invention refers to.

Said physical phenomenon concerns in general an inductance variation taking place at solenoid ends during the deactivation phase of the valve due to armature motion. Said inductance variation can be detected as voltage variation at solenoid ends, or as variation of current flowing inside the solenoid.

In particular, document WO-A-9413991 shows physical models concerning the following cases by way of examples:

"Ideal" vs. "Real" Armature Material:

Case of armature with "ideal" magnetic material, which requires the application of a "measuring" current or voltage such as not to actuate the valve, but such as to enable the determination of a "characteristic" variation in applied current or voltage resulting from inductance variation Case of armature with "real" magnetic material, which does not require the application of a measuring signal, since remanent magnetization can be exploited as a source for applying a "measuring" current or voltage that will undergo inductance variation.

Valve with Armature and Shutter Making up One Body vs. Two Separate Bodies:

Case of valve with movable element made up of one body including armature and shutter: during the deactivation phase, the shutter reaching the abutting position causes an abrupt speed variation also for the magnetic armature (since the latter is integral with the shutter)

Case of valve with magnetic armature separate from shutter: during the deactivation phase, the shutter reaching the abutting position causes an abrupt speed variation for the magnetic armature (which "unhooks" itself from the shutter from then on following its "own" motion).

Concerning the prior document mentioned above, the discontinuities found out in the cases of one movable body (speed discontinuity) and of armature separate from shutter (acceleration discontinuity) are due to voltage and spike discontinuities of the first derivative of voltage on the solenoid in case of one movable body, to voltage and spike derivative discontinuities of the second derivative of voltage on the solenoid in case of armature separate from shutter.

Said known solution further proposes a circuit for measuring voltage on the solenoid and for detecting whether the aforesaid voltage (and its derivatives) exceed predefined thresholds in the various cases of different types of electro-valve.

The drawback of said known method consists in the need to analyze the derivative (first and second derivative in case of two separate bodies) of a signal extracted from a measure (and therefore extremely noisy) and to have to analyze it according to the exceeding of pre-established thresholds. These techniques are generally subject to critical states when calibrating decision thresholds (function of operating conditions and of properties of the fluid in which the valve operates) and are further very much affected by measuring noise, which tends to create spikes on the signal (and therefore on its derivatives) that may lead to false detections.

U.S. Pat. No. 5,995,356 describes the effect on current flowing inside the solenoid during the deactivation phase, with a solenoid reactivation procedure resembling the one of document WO-A-9413991. In particular, it should be pointed out that, when the shutter reaches the second abutting position during the deactivation phase, there occurs a "characteristic elbow-like modification" in said current. However, no specific method is proposed for determining the instant in which said characteristic modification occurs.

AIM OF THE INVENTION

Differently from the method for detecting deactivation time as proposed in document WO-A-9413991 and based on the processing of a voltage signal (and of its derivatives) on the solenoid, the method proposed in the present invention aims at analyzing current flowing inside the solenoid during valve deactivation phase, further overcoming the problem of a strong sensibility to noise due to the derivation process.

An aim of the present invention is therefore to propose an original method based on current acquisition in the solenoid during valve deactivation phase, which enables to detect the instant in which the shutter reaches the abutting position during the deactivation phase, said method applying both to electro-valves made as one body and to electro-valves in which the armature is separate from the shutter (for which detection is more critical), and said method applying both to the case in which an additional "measuring" current such as not to actuate the valve is applied, and to the case exploiting conversely the eddy current due to remanent magnetization of the non-ideal magnetic material constituting the armature.

The method described in the present invention further aims at overcoming the drawbacks disclosed above related to a strong sensibility to noise and dependence on the calibration of specific thresholds.

THE INVENTION

The method according to the invention is characterized in that it comprises the following steps:

a) assessment of nominal deactivation time and deduction from said time of the assessed instant in which the deactivated shutter reaches the stroke end position, b) application of an appreciable current flow through the solenoid during shutter motion, after solenoid deactivation, adjusted in a time range comprising the assessed nominal deactivation instant, c) acquisition of a convenient number of current samples, d) identification of two interpolation curves for acquired data, which approximate the development of the samples acquired before and after the instant in which the shutter reaches the stroke end, respectively, e) determination of the intersection point of said interpolation curves, from which the intersection instant can be inferred, f) identification of shutter stroke end instant with said intersection instant.

The current in which the characteristic change takes place can be supplied by a dedicated circuit, or it can be generated by remanent magnetization in armature material, and in both cases it can be measured through a suitable circuit.

ADVANTAGES OF THE INVENTION

The method according to the invention has the following advantages with respect to known methods:

low sensibility to measuring noise: as a matter of fact, the process of search of the interpolation curves whose intersection enables to determine the instant in which the shutter abuts against the stroke end, is such as to filtrate samples that are "distant" from said curves, excellent detectability of deactivation time for a solenoid valve made up of one body or with magnetic armature separate from shutter, also in environmental and operating conditions of the valve in which the shutter is extremely attenuated: as a matter of fact, in case of two separate bodies, armature motion before and after shutter disconnection has just to be appreciably different (which is possible also by acting suitably upon valve construction parameters) so as to enable an adequate detection with the method of interpolation curves, simple calculations leading to the determination of deactivation time, and subsequent possibility of use of the measure made with the method according to the present invention for compensating operating dispersions/drifts by suitably acting upon the control signal.

BRIEF DESCRIPTION OF THE DRAWINGS

Further characteristics and advantages of the invention will be evident from the following description with reference to the accompanying drawings, provided by mere way of non limiting example, in which:

FIG. 5 is a flow chart showing the various steps of the method according to the invention.

DETAILED DESCRIPTION OF THE INVENTION

In order to provide a detailed description of the method according to the invention reference will be made in the following to a specific embodiment of the measuring device and to a specific embodiment of the valve that should undergo the test, these embodiments being no limitation to the applicability of said method.

In particular, the case will be taken into consideration (which is the most complex condition of deactivation time detection) concerning a solenoid valve with shutter separate from magnetic armature, the latter being made of real magnetic material with remanence.

Furthermore, the case will be taken into consideration, in which interpolation curves from whose intersection shutter stroke end instant will be inferred, are two intersecting lines. This specific case, though without making the developed method less general, enables to obtain an appreciable reduction of calculations in charge of the control system in the process for identifying the intersection of interpolation curves.

Description of the Valve

Figure 1A:
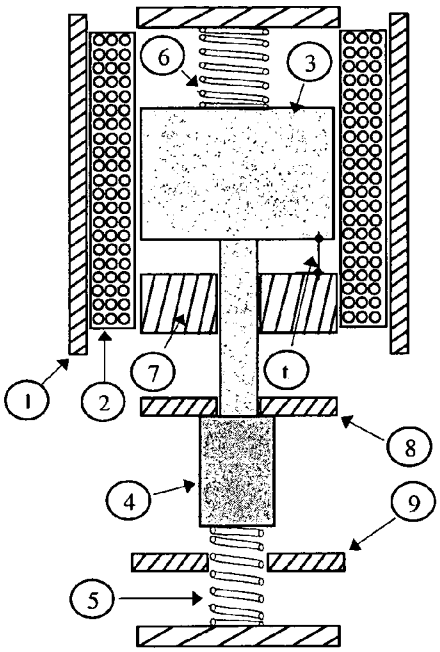
FIGS. 1A, 1B, 1C are schematic views of an electro-valve with separate armature and shutter, in its rest deactivated condition (FIG. 1A), in its activated condition (FIG. 1B) and in the final portion of the deactivation phase, when armature motion is free (FIG. 1C), respectively.
Figure 1B:
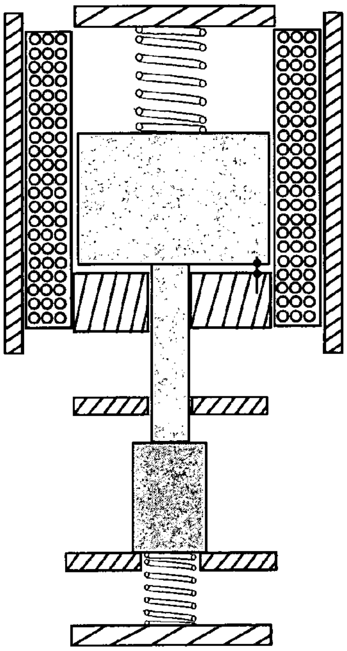
Figure 1C:
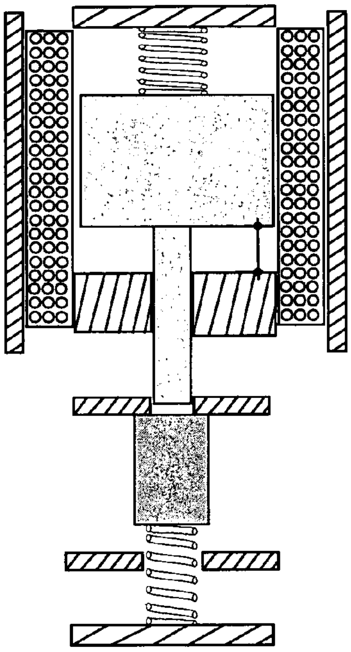

Given the valve shown in FIGS. 1A, 1B, 1C, numbers in said figures refer to the following elements:

1: Screen made of ferromagnetic material
2: Activation winding (solenoid)
3: Movable body containing magnetic armature
4: Shutter
5: Return spring of shutter
6: Return spring of movable body containing armature
7: Stationary part of magnetic circuit
8: Stroke end of shutter in deactivation phase (second abutting position)
9: Stroke end of shutter in activation phase (first abutting position)
t: Gap of magnetic circuit The first movable element (element 4) acts as shutter and has a field of movement limited between two predefined positions ("first abutting position" related to the condition of activated solenoid—FIG. 1A, and "second abutting position" related to the condition of deactivated solenoid—FIGS. 1A, 1C). The second movable element (element 3), incorporating a magnetic armature sensible to the electric control given to activation solenoid, transfers motion to the shutter during solenoid activation phase until the first abutting position is reached (FIG. 1B) and holds shutter 4 in said position for the whole duration of activation current. During the deactivation phase, conversely, shutter 4 undergoing a return force (spring 5) transfers motion to second movable element 3 until the second abutting position of the shutter is reached. Once said position is reached, second movable element 3 incorporating the magnetic armature disconnects from the shutter and develops its own motion, which is totally independent from shutter motion (FIG. 1C); said independent motion of the second element with magnetic armature is subject to a return force tending to bring said element back in contact with the shutter.

The two return springs 5, 6 of movable elements 3, 4 are such as to hold—the solenoid being deactivated—the two elements in mutual contact and in particular the shutter in the second abutting position.

Figure 2:
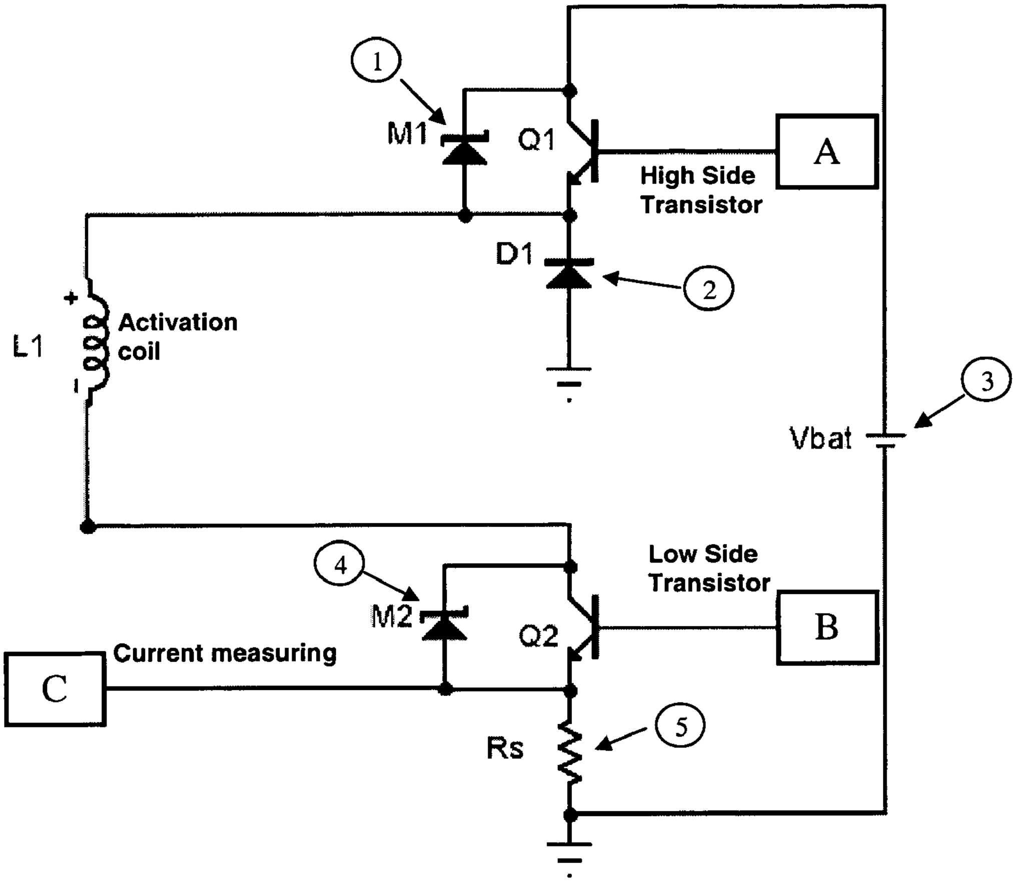
FIG. 2 is a diagram showing the valve piloting circuit.

Description of the Circuit for Valve Control, of the Motion of Movable Elements During Activation/Deactivation Phase and of Current Profile During Deactivation Phase FIG. 2 shows a possible embodiment of the valve piloting circuit, which enables to meet both solenoid valve control requirements and requirements of current measure in the solenoid that are necessary for determining the instant in which the second abutting position of the shutter is reached.

Numbers in FIG. 1 refer to the following elements:

1: Zener diode for "High Side" transistor protection
2: Recirculation diode
3: Supply voltage
4: Zener diode for "Low Side" transistor protection
5: Resistance for current measuring
A: Piloting signal for "High Side" transistor
B: Piloting signal for "Low Side" transistor
C: Signal towards data acquisition and analysis system
L1: Activation solenoid FIG. 3*a* shows for a more general understanding of activation and deactivation phenomenon of the solenoid valve with separate armature and shutter, the developments referring to the following quantities: current flowing inside solenoid, shutter position acquired with a position sensor and detection of its impact in the first and second abutting position through an accelerometric sensor placed near the valve undergoing the test, armature position acquired with a position sensor.

Figure 3A:
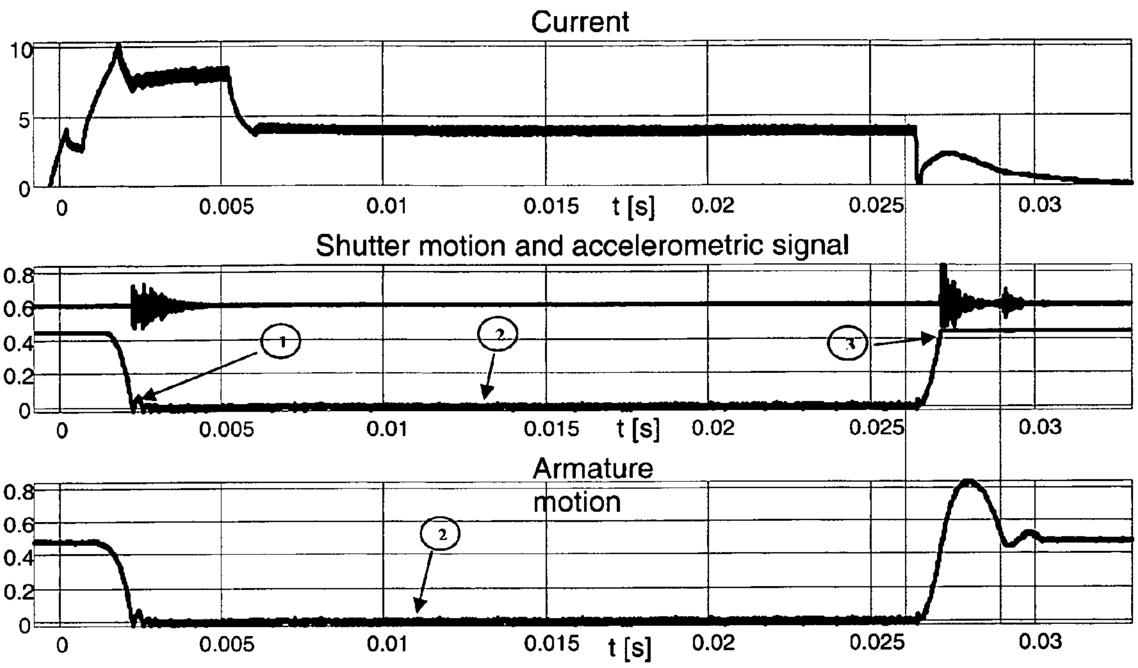
FIG. 3*a* is a diagram showing current profile, shutter motion and armature motion (activation and deactivation phase) of the valve.

Reference numbers in FIG. 3*a* have the following meaning:

1: Shutter abutment to stroke end in activation phase (armature in contact with shutter)

2: Activated electro-valve with armature holding shutter in stroke end position in activation phase

3: Shutter abutment to stroke end in deactivation phase (armature separates from shutter).

Figure 3B:
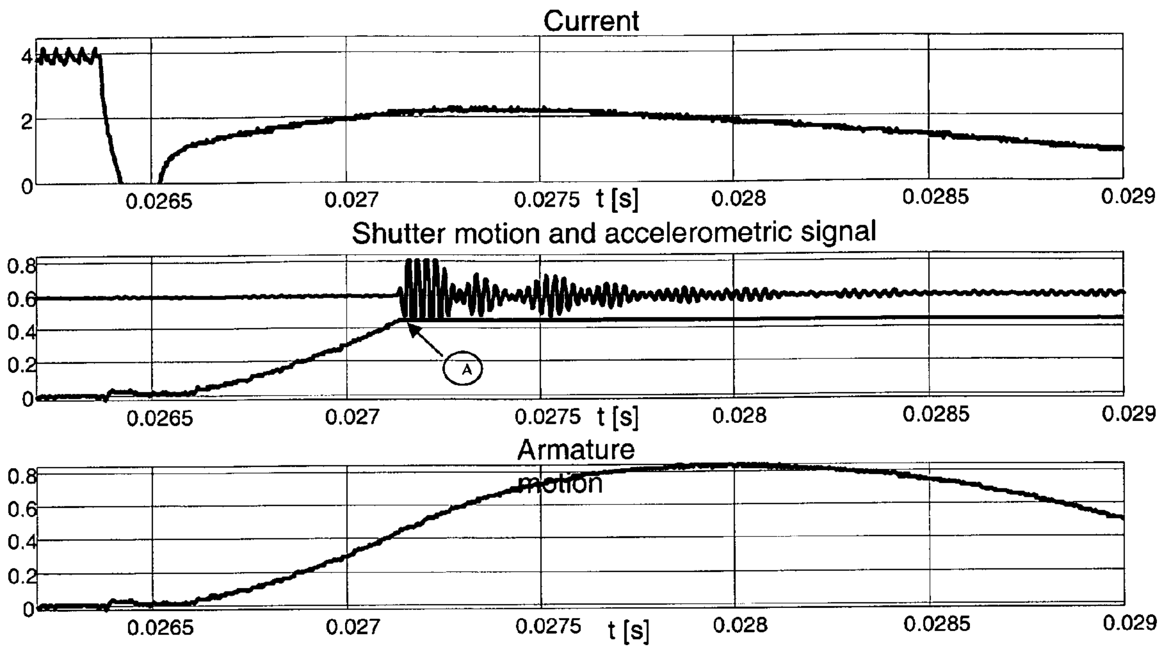
FIG. 3*b* is magnified view of the part of diagrams in FIG. 3*a* referring to valve deactivation phase.

FIG. 3*b* shows a time expansion of the diagram in FIG. 3*a* related only to valve deactivation phase. In said figure letter A refers to shutter abutment to stroke end in deactivation phase (armature separate from shutter).

The following describes in detail only the technique used for helping current circulation during valve deactivation phase after the end of activation current.

Figure 4:
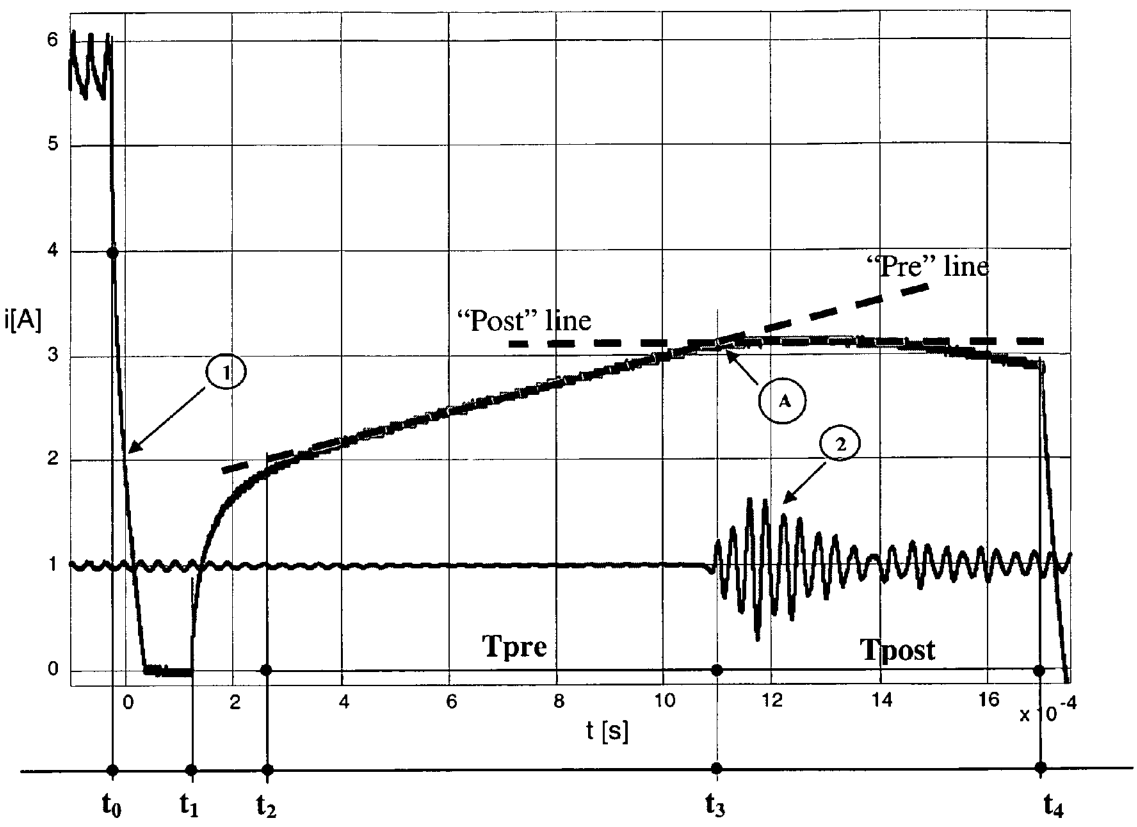
FIG. 4 is a diagram showing current in the solenoid during valve deactivation phase.

In FIG. 4 reference numbers have the following meaning:

1: Current signal

2: Accelerometric signal detecting shutter abutment to stroke end t0: Instant in which valve deactivation begins t1: Instant in which "Low side" transistor closes again (beginning of recirculation current)

t2: End of phase of discharge of stray capacitances t3: Instant in which shutter reaches abutting position in deactivation phase t4: Instant in which "Low side" transistor re-opens (end of recirculation current)

Tpre: Time interval useful for sampling before expected abutting instant

Tpost: Time interval useful for sampling after expected abutting instant

"Pre" line: Interpolation line of points before abutment in deactivation

"Post" line: Interpolation line of points after abutment in deactivation

A: Intersection of interpolating lines identified with the suggested method, from which the instant in which the shutter reaches the abutting position in deactivation phase can be inferred (it corresponds to instant t3).

With reference to FIG. 4, when the solenoid through which current flows is disconnected (time t0), it keeps a given residual energy that discharges slowly through stray resistances of the winding and of the piloting circuit. If one of the two ends of the winding is reconnected (time t1), residual energy can discharge by circulating a current when movable parts inside the electro-valve move. By programming the delay (time interval t1–t0) between winding disconnection and its reconnection, the amount of discharge energy and therefore the current level—which should be sufficiently high to enable the instant of shutter stroke end to be identified, though not so high as to brake excessively the movable parts during valve deactivation—should be modulated.

Once reconnection has take place (time t1), the discharge phase of stray capacitances present in the circuit should be ended (time t2).

After that time, current will grow under the action of moving armature (accelerated by the return force acting upon the shutter), with an approximately straight development, until the abutment of said shutter (time t3).

At time t3 the shutter ceases to move the armature, which therefore moves with its own motion decelerated by the return force of the armature and attenuated by the properties of the medium in which the armature moves), and current will have an approximately curvilinear development tending to decrease.

At time t4, which should be programmed so as to be sufficiently distant from armature stroke end instant, the ends of the solenoid winding are finally disconnected and current gets null.

Description of the Method for Processing the Current Signal

The proposed method includes the following steps, which are indicated in the flow chart of FIG. 5:

Assessment of nominal deactivation time (defined as the "expected" value for the time interval between current deactivation in the solenoid and shutter stroke end instant), depending on environmental and operating conditions of the valve (e.g. temperature, pressure, type of fluid in which it operates, etc.). Said time can be obtained by means of an experimental characterization (or of a model representing it mathematically) of the development of deactivation time as a function of the parameters on which it depends. The information on nominal deactivation time is used for a suitable "adjustment" of the time window inside which a suitable current flow should be enabled during valve deactivation phase, and consequently inside which the method for detecting the shutter abutting instant according to the present invention should be activated.

Application of an appreciable current flow through the solenoid during shutter motion, after solenoid deactivation, with the technique previously described. The result is a current shape adjusted on the assessed nominal deactivation instant.

Acquisition by means of a suitable measuring device of an adequate number of current samples in the solenoid (in the case of the circuit of FIG. 2*a*, current is measured by detecting a voltage on measuring resistance Rs) during time interval t4–t2. In particular, all acquired samples can be regarded as belonging to two classes, the first class being the one of current samples acquired in interval Tpre before shutter abutting instant, the second class being the one of current samples acquired in interval Tpost after shutter abutting instant.

Identification of two interpolation lines, which best approximate data belonging to the first class of samples (acquired in time interval Tpre) and to the second class of samples (acquired in time interval Tpost), respectively.

Calculation of the time instant in which the intersection of the two interpolation lines is needed ("pre" line and "post" line).

Identification of shutter stroke end instant with said intersection instant.

As was already mentioned above, the method according to the present invention applies also to the case of a shutter made as one body with the armature.

The current on which the characteristic change occurs can be supplied by a dedicated circuit or generated by remanent magnetization in armature material, and in both it can be measured by means of a convenient circuit.

Obviously, though the basic idea of the invention remains the same, construction details and embodiments can widely vary with respect to what has been described and shown by mere way of example, however without leaving the framework of the invention.

The invention claimed is:

1. Method for determining the instant of reaching of a stroke end position in a deactivation phase of a movable element acting as a shutter and being part of a solenoid electro-valve, wherein it comprises the following steps:

a) assessment of nominal deactivation time and deduction from said time of the assessed instant in which the deactivated shutter reaches the stroke end position, b) application of an appreciable current flow through the solenoid during shutter motion, after solenoid deactivation, adjusted in a time range comprising the assessed nominal deactivation instant, c) acquisition of a convenient number of current samples, d) identification of two interpolation curves for acquired data, which approximate the development of the samples acquired before and after the instant in which the shutter reaches the stroke end, respectively, e) determination of the intersection point of said interpolation curves, from which the intersection instant can be inferred, f) identification of shutter stroke end instant with said intersection instant.

2. Method according to claim 1, wherein the current on which the characteristic change occurs is supplied by a dedicated circuit.

3. Method according to claim 1, wherein the current on which the characteristic change occurs is generated by remanent magnetization in armature material.

4. Method according to claim 2 or 3, wherein the current on which the characteristic change occurs is measured through a circuit.

* * * * *